United States Patent
Arnon et al.

(10) Patent No.: US 8,706,959 B1
(45) Date of Patent: Apr. 22, 2014

(54) VIRTUAL STORAGE MACHINE

(75) Inventors: Dan Arnon, Somerville, MA (US);
David Meiri, Cambridge, MA (US); Ian Wigmore, Westborough, MA (US);
Patrick Brian Riordan, Watertown, MA (US); George M. Ericson, Shrewsbury, MA (US); Navindra Sharma, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 495 days.

(21) Appl. No.: 12/459,474

(22) Filed: Jun. 30, 2009

(51) Int. Cl.
*G06F 12/00* (2006.01)

(52) U.S. Cl.
USPC .......................................... 711/114

(58) Field of Classification Search
None
See application file for complete search history.

(56) References Cited

U.S. PATENT DOCUMENTS

| | | | |
|---|---|---|---|
| 6,216,202 B1 * | 4/2001 | D'Errico | 711/112 |
| 7,085,867 B2 * | 8/2006 | Qi | 710/200 |
| 8,156,306 B1 * | 4/2012 | Raizen et al. | 711/202 |
| 2003/0079014 A1 * | 4/2003 | Lubbers et al. | 709/225 |
| 2003/0084241 A1 * | 5/2003 | Lubbers et al. | 711/114 |
| 2004/0193944 A1 * | 9/2004 | LeCrone et al. | 714/5 |
| 2006/0112244 A1 * | 5/2006 | Buah et al. | 711/162 |
| 2006/0221720 A1 * | 10/2006 | Reuter | 365/189.05 |
| 2007/0104099 A1 * | 5/2007 | Mutnuru et al. | 370/229 |
| 2010/0235832 A1 * | 9/2010 | Rajagopal et al. | 718/1 |

* cited by examiner

*Primary Examiner* — Duc Doan
(74) *Attorney, Agent, or Firm* — Krishnendu Gupta; Theodore Chen; Daniel P. McLoughlin (57) ABSTRACT

The disclosure relates to a method and system for creating a virtual array in a physical array. Unassigned whole volumes in at least one physical array are identified. The identified volumes are associated with a first virtual array. Unique names are given to the identified volumes. At least one path is assigned to the first virtual array. The first virtual array may be associated with a second virtual array. Data may be migrated or replicated from the first virtual array to the second virtual array using existing array services.

20 Claims, 10 Drawing Sheets

VIRTUAL STORAGE MACHINE

TECHNICAL FIELD

This invention relates generally to data storage systems, and more particularly, to systems and methods of virtualizing storage systems.

BACKGROUND

As is known in the art, virtualization was brought about by two main economic factors: the need to increase utilization and the need to simplify management of systems. With regard to servers, virtual servers have brought up utilization of servers from about 20%-30% to 80% and higher, and have simplified management by packaging the whole application environment into one unit.

Various attempts have been made to virtualize storage systems. Products such as EMC's Invista and IBM's SVC pool storage from existing disk arrays while providing basic storage management functions to the storage pool. Unfortunately, these products block the services provided by the existing disk arrays. These services may include local and remote replication, data copy, data provisioning, etc. When using these products, the disk array is reduced to providing only raw capacity (e.g. 500 GB) of storage. Since most of the value of the disk array is in the services provided and not in the raw capacity, these products essentially eliminate most of the value of disk arrays.

Further, these products do not necessarily simplify management of storage systems. The existing disk arrays are still physically on the floor and need to be managed, while the new storage pool now needs to be managed using a separate set of management tools.

There is a need, therefore, for an improved method, article of manufacture, and apparatus for virtualizing data storage systems.

SUMMARY

The disclosure relates to a method and system for processing data in a data storage system. Unassigned whole volumes in at least one physical array are identified. The identified volumes are contained in a first virtual array. Unique names are given to the identified volumes that do not relate to the underlying physical array. Ports are assigned to the first virtual array. The first virtual array may be associated with a second virtual array. Data may be migrated or replicated from the first virtual array to the second virtual array using existing array services.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

The present invention creates a virtual array inside a physical array, while maintaining array services of the physical array. No extra network equipment or external appliance is necessary to provide services such as replication, migration, copying, etc. Management of the virtual arrays is simplified, and users retain much of their investment in the physical array.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data storage system, but it should be understood that the principles of the invention are not limited to this particular configuration. Rather, they may be applied to any system in which files or objects are stored, either on a local or remote device, and the device may comprise one or more storage devices. Disclosed herein are a method and system to efficiently virtualize a data storage system.

Figure 1:
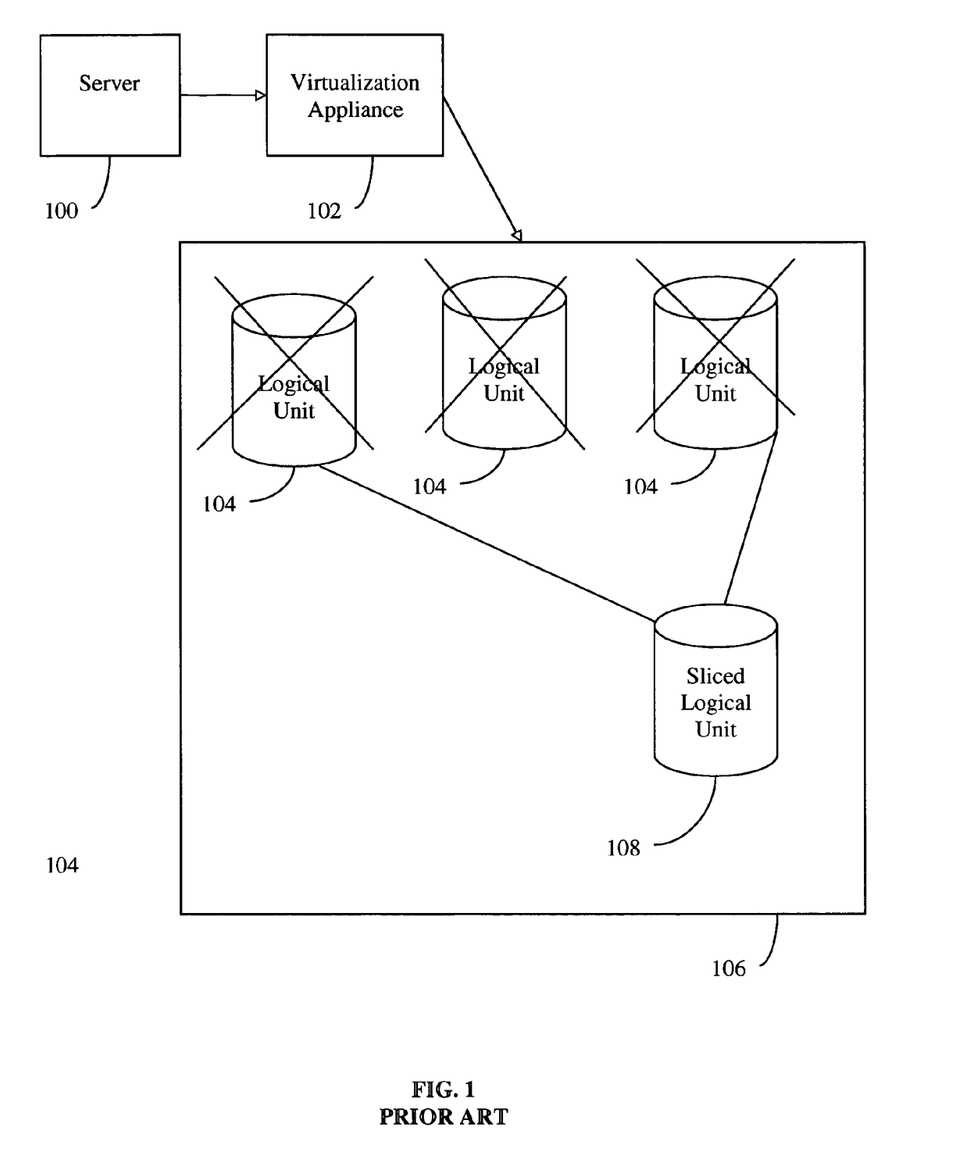
FIG. 1 is a diagram of a prior art system having an external virtualization layer.

FIG. 1 shows a prior art storage virtualization system. Server 100 is connected to Virtualization Appliance 102. Virtualization Appliance 102 serves as the medium between Server 100 and Array 106. Array 106 contains multiple Logical Units 104. Independent of Virtualization Appliance 102, Array 106 has multiple services. These array services include copy, replication, migration, etc., which reference Logical Units 104. However, Virtualization Appliance 102 "slices and dices" Logical Units 104 into Sliced Logical Units 108. Sliced Logical Units 108 are "sliced and diced" logical units and are assigned new designations.

Therefore, Array 106 sees Sliced Logical Units 108 and not Logical Units 104. Any array services applied in reference to Logical Units 104 are meaningless to Server 100, which now thinks in terms of Sliced Logical Units 108 due to Virtual Appliance 102. Sliced Logical Units 108 are generated from a mix of parts from Logical Units 104, so it is difficult to determine a correlation between Sliced Logical Units 108 and Logical Units 104.

The techniques described herein helps maintain the accessibility of underlying physical array services by creating an abstraction of the identity of existing objects, which include logical units, consistency groups and paths (e.g. Initiator-Target nexuses), and by embedding a virtual array in the actual physical array, among others. The techniques described herein package objects together with metadata into a virtual storage machine (VSM) that can be managed as a whole. The techniques described herein do not break down the objects that already exist in the storage array—they only change the objects' identity, namely the way the objects are presented to the outside world, and tie the objects in a well defined package that serves as a management reference point. This sort of light touch (e.g. no "slicing and dicing") has less of an impact on array services than conventional virtualization techniques. The underlying physical array is visible to applications since the logical units were not broken up, and thus, underlying physical array services are accessible.

Figure 2:
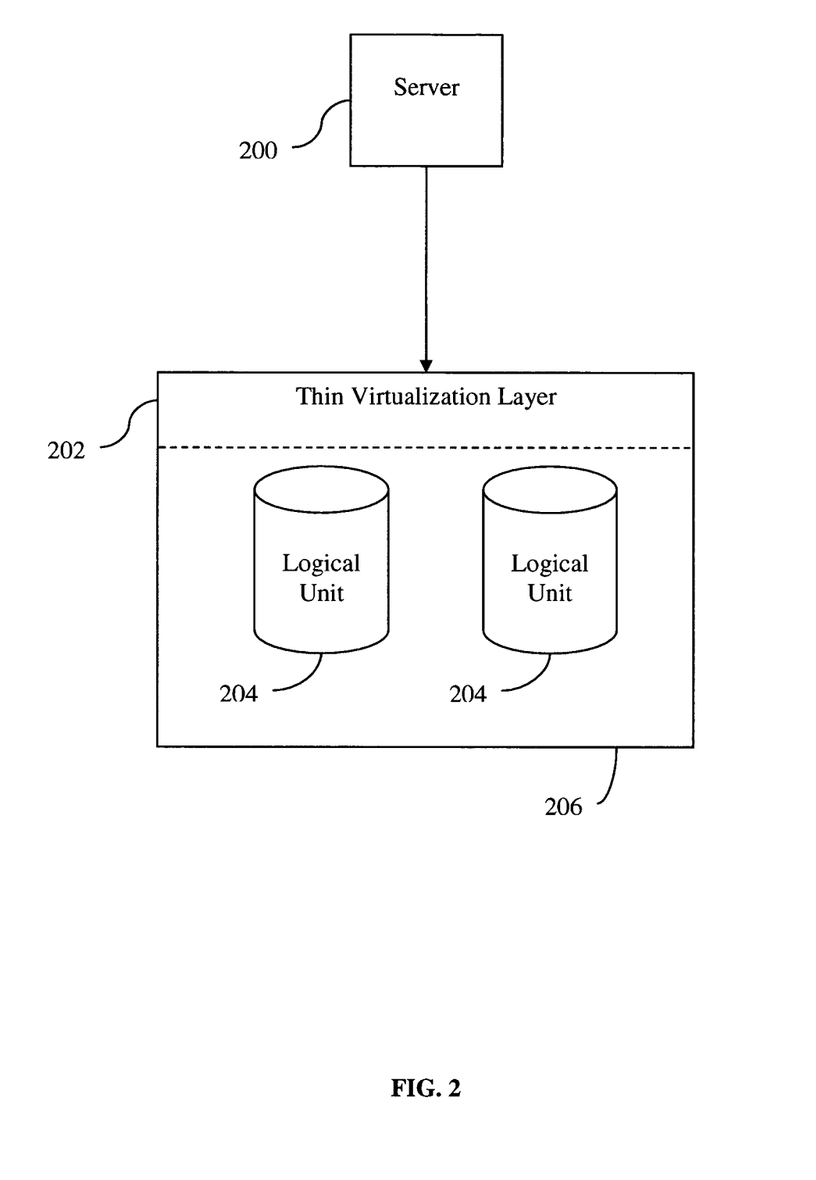
FIG. 2 is a diagram of one embodiment of the present invention.

The abstraction is accomplished via a thin virtualization layer added to an existing array. The virtualization layer is "thin" because the virtualization does not hide much of the underlying structure of the physical array, nor the array services. It is also "thin" because it does not require an appliance or equipment external to existing arrays. As shown by FIG. 2, the virtualization layer is now a part of the physical array. Server 200 now connects to Array 206. However, Thin Virtualization Layer 202 may change the identities of Logical Units 204 (without breaking them down) and give the identities to Server 200.

The whole array need not be virtualized. Rather, it is up to the user to decide which portions of the array to virtualize and which to not. By allowing portions of an array to be virtualized, multiple virtual storage machines may reside on one physical array. In fact, the original physical array identity may still be used for its original storage purposes, assuming that the non-virtualized portion of the array has sufficient storage capacity. For example, if pre-virtualization the original physical array used 300 GB of its 1 TB storage capacity, the post-virtualization physical identity should have a capacity of at least 300 GB. Further, there may be multiple virtual storage machines on one physical array. For example, a user may designate one physical identity, and five virtual storage machines on one physical array.

Virtualized volumes cannot use conventional techniques to determine a world wide name (WWN). Conventional WWNs are tied to physical array identities. Since virtualized volumes may potentially span across several physical arrays, it is unhelpful to tie a WWN to a physical array's serial number or other physical characteristics. In some embodiments, a WWN may be defined by a user. For example, a user wishes to create a virtual storage machine in a physical array A1 with 256 virtual volumes. First, a user creates a virtual storage machine (VSM) identifier (e.g., vsm_id). Next, a user creates a VSM in the physical array A1 with the VSM identifier. The user then finds 256 unassigned volumes in the physical array A1 and assigns them to the VSM. The 256 volumes are then assigned WWNs that reflect their VSM affiliation and are independent of the physical array. In particular, these WWNs are not based on the serial number of the physical array. The WWN may consist of a company ID, a VSM ID, and a sequence number. In this example, the WWN for the first virtualized volume may be (company ID)+(VSM ID)+"0". The second may be (company ID)+(VSM ID)+"1", and so on until (company ID)+(VSM ID)+"255". If the array A1 can remotely mirror logical units to a second physical array A2, the user may create a second node of the same VSM on the second physical array A2. The user then may find 256 unassigned volumes in the second physical array A2 and assign them to the VSM. The user then may create pairwise remote mirroring relations between the 256 volumes in physical array A1 and the 256 volumes in physical array A2. The user then may assign WWNs to the 256 volumes on the physical array A2 that are identical to the WWNs assigned to their mirror partners on physical array A1. The effect is that the 256 pairs of volumes that are mirrored between physical array A1 and physical array A2 now appear as simply 256 virtual volumes that all reside in a single virtual array, the VSM. The 256 virtual volumes are part of the virtual storage machine. In addition to the volumes, a VSM ID, a cluster of one or more physical arrays, a set of paths in these physical arrays, among others, may be added to form the virtual storage machine.

Figure 3:
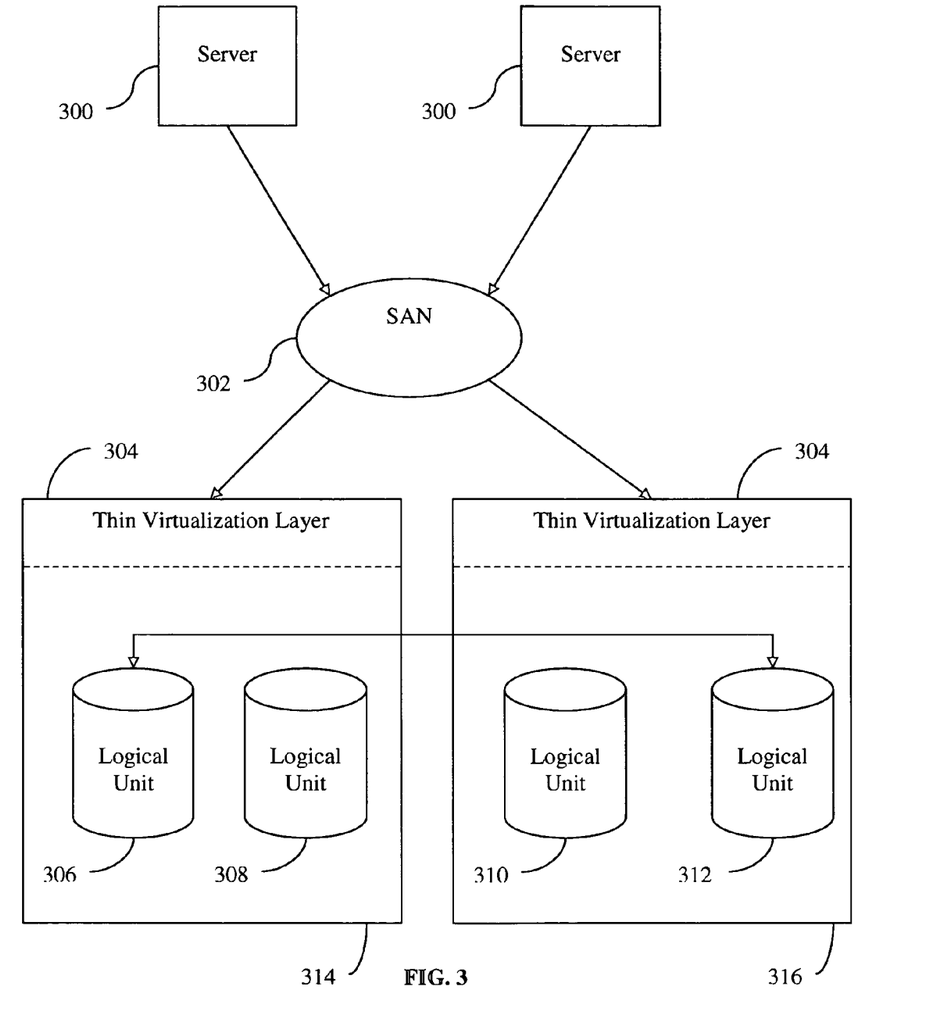
FIG. 3 is a diagram of one embodiment of the present invention.

The present invention may be used in a wide variety of systems containing numerous servers and arrays. FIG. 3 illustrates a system in accordance with one embodiment of the present invention containing multiple arrays and servers in a storage area network (SAN). Servers 300 are connected to SAN 302. SAN 302 is connected to Physical Arrays 314 and 316. Physical Arrays 314 and 316 may be geographically dispersed. For example, both arrays may be in the same room, or the arrays may be miles apart. Physical Arrays 314 and 316 have a Thin Virtualization Layer 304. Physical Array 314 has Logical Units 306 and 308, while Physical Array 316 has Logical Units 310 and 312. The arrow connecting Logical Units 306 and 312 indicates that Logical Unit 306 and 312 are remotely mirrored, meaning both Logical Units 306 and 312 have the same data and appear as one logical unit to Servers 300.

Though FIG. 3 is illustrated with reference to a SAN system, the techniques described herein are equally applicable to other computing systems. For example, the techniques described herein may play a role in "cloud" environments. "Clouds" are environments where resources can be carved out of and rented out of a huge repository of resources. As such, the techniques described herein may assist in carving out and renting out storage capacity to "cloud" users.

In some embodiments, the thin virtualization layer comprises a Cluster Mechanism that allows physical arrays to join and leave the cluster at any time. The Cluster Mechanism comprises a Locking Mechanism that allows member arrays to share locks and synchronize operations between them. The Lock Mechanism allows the remaining arrays in the cluster to steal a lock that was previously held by a departing array. With the help of the Lock Mechanism the arrays that are members of the cluster can share metadata such as the SCSI state of logical units. They can access and change that data without fear of collisions, data corruption or race conditions.

When any of the arrays leaves the cluster, either voluntarily or involuntarily, the Cluster Mechanism notifies the remaining members of the cluster of that event. The notification is synchronous, meaning that the Cluster Mechanism does not allow any further manipulation of shared data before the remaining members are notified. This enables the remaining members to take corrective actions, such as the splitting of a consistency group, in a timely fashion that protects the integrity of the user's data and their data availability requirements.

When an array gets disconnected from the cluster, the Cluster Mechanism notifies that array that it is no longer a member of the cluster. This allows the disconnected array to take corrective action, such as disabling all the paths that are owned by the VSM. This prevents application servers that are still connected to the disconnected array from reading or modifying stale data.

When a new array needs to be added to the cluster, the Cluster Mechanism in that array contacts the Cluster Mechanism of a known member of the cluster and asks for permission to join. The known member causes the cluster to go through a state change, adding the new array as a member. As an additional step, the known member creates a snapshot of its shared data and uses the Replication Mechanism to send the copy to the new member.

In some embodiments, the thin virtualization layer also comprises a Replication Mechanism. The replication mechanism makes sure that every time shared data is updated by any member of the cluster, this shared data is replicated in a synchronous fashion to all the other members of the cluster. The Replication Mechanism also gives a cluster member that received a synchronous shared-data update from another member an opportunity to act on the update and take additional actions in a fashion that is synchronous with the shared-data update.

Figure 4:
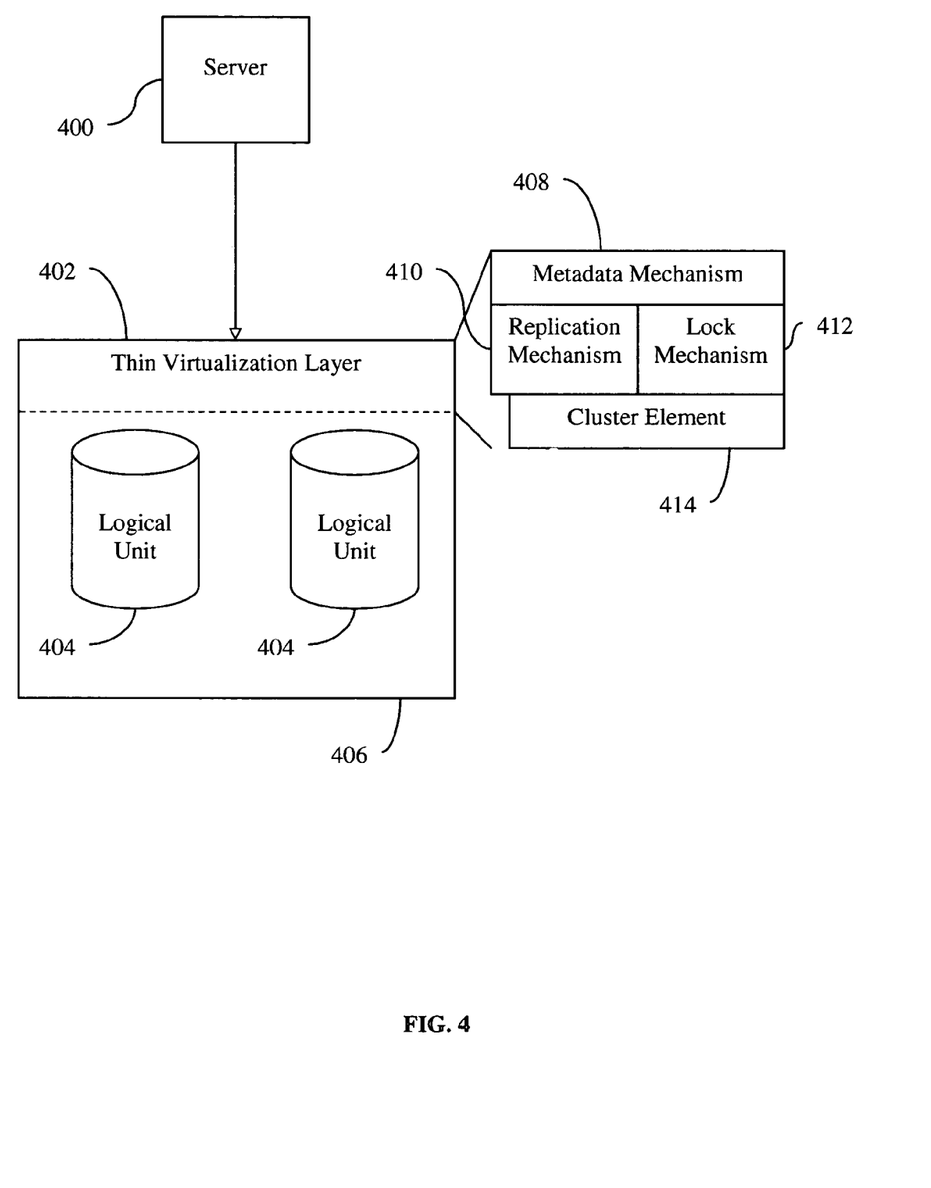
FIG. 4 is a diagram of one embodiment of the present invention.

This is illustrated in FIG. 4. Server 400 connects to Array 406. Array 406 contains Logical Units 404 as well as Thin Virtualization layer 402. Thin Virtualization Layer 402 comprises of Metadata Mechanism 408, Replication Mechanism 410, Lock Mechanism 412, and Cluster Mechanism 414.

The architecture of a cluster may vary. Such architectures may include majority voting, quorum, and tokens, among others. Node membership in cluster elements may change through user additions or removals. In some embodiments, a node may be a member of multiple clusters simultaneously.

This allows for many existing array services to be utilized, such as migration or replication. No new network equipment, or modification of the existing array structure is required.

For example, consider a simple case in which a cluster contains only one virtual array. In order to replicate the virtual array, a user may add a new virtual array to the cluster via The Cluster Mechanism. The new virtual array may already exist, or may be created as described herein. The new virtual array should also have the same number of volumes as the original virtual arrays, and corresponding volumes should be the same size. When the new virtual array's volumes are added to the cluster, the new virtual array's volumes are assigned the same WWN as the original virtual array's volumes, effectively linking them to each other. Data is then synchronized between the two linked volumes. This whole process is transparent to server applications because the server has had uninterrupted access to the original virtual array and its volumes. The cluster itself maintains its state and manages its membership list through the same communication link that the arrays use to mirror data between them.

The process for migration is similar to replication. After synchronizing the linked volumes, the original virtual array may be removed from the cluster. Since the new array's volumes have the same WWN as the originals and were synchronized until the moment of removal, the server will not notice the removal of the original virtual array from the cluster. The server will continue to behave as if nothing happened. Indeed, from the server's point of view, nothing has happened. The thin virtualization layer hides all of these processes from the server. The server may think it is accessing the "same" array because it is referencing the same WWNs, when in fact the WWNs are migrated from array to array and the "same" array itself spans across multiple arrays.

Figure 5:
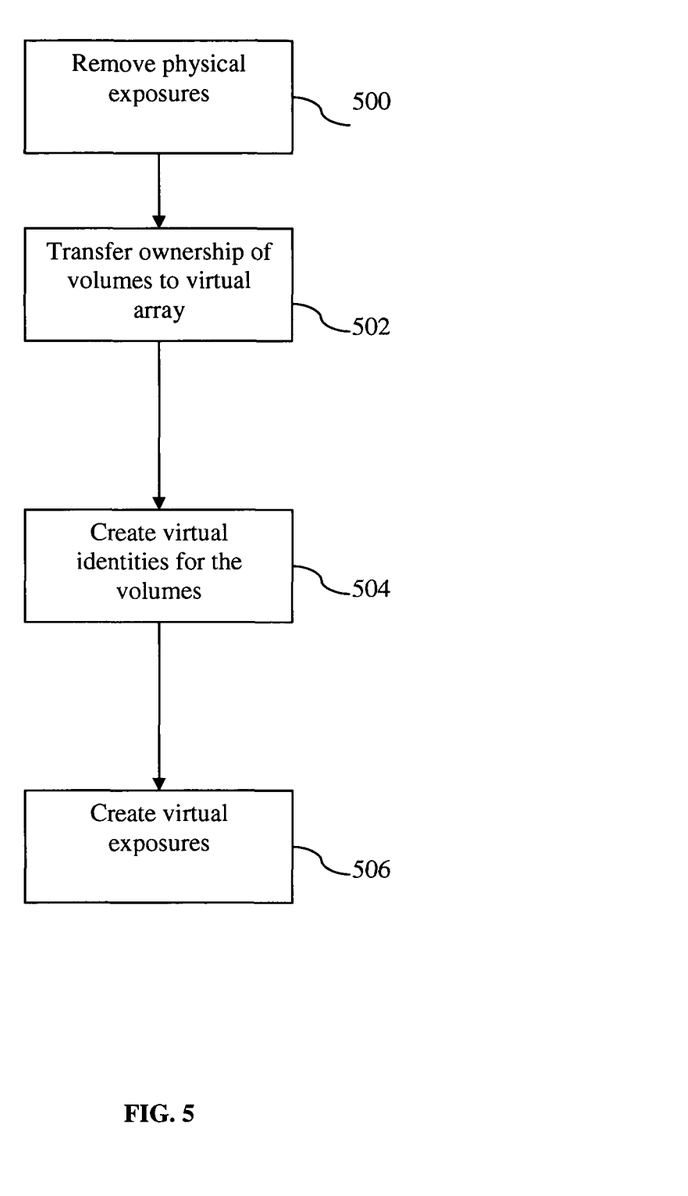
FIG. 5 is a flowchart illustrating a process to virtualize a physical array in accordance with the present invention.

FIG. 5 is a flowchart illustrating how to create a virtual array inside a physical array. In step 500, physical exposures are removed. In step 502, the ownership of volumes in the physical array are transferred to a virtual array. In step 504, virtual identities are created for the volumes owned by the virtual array. In step 506, virtual exposures are created.

Figure 6A:
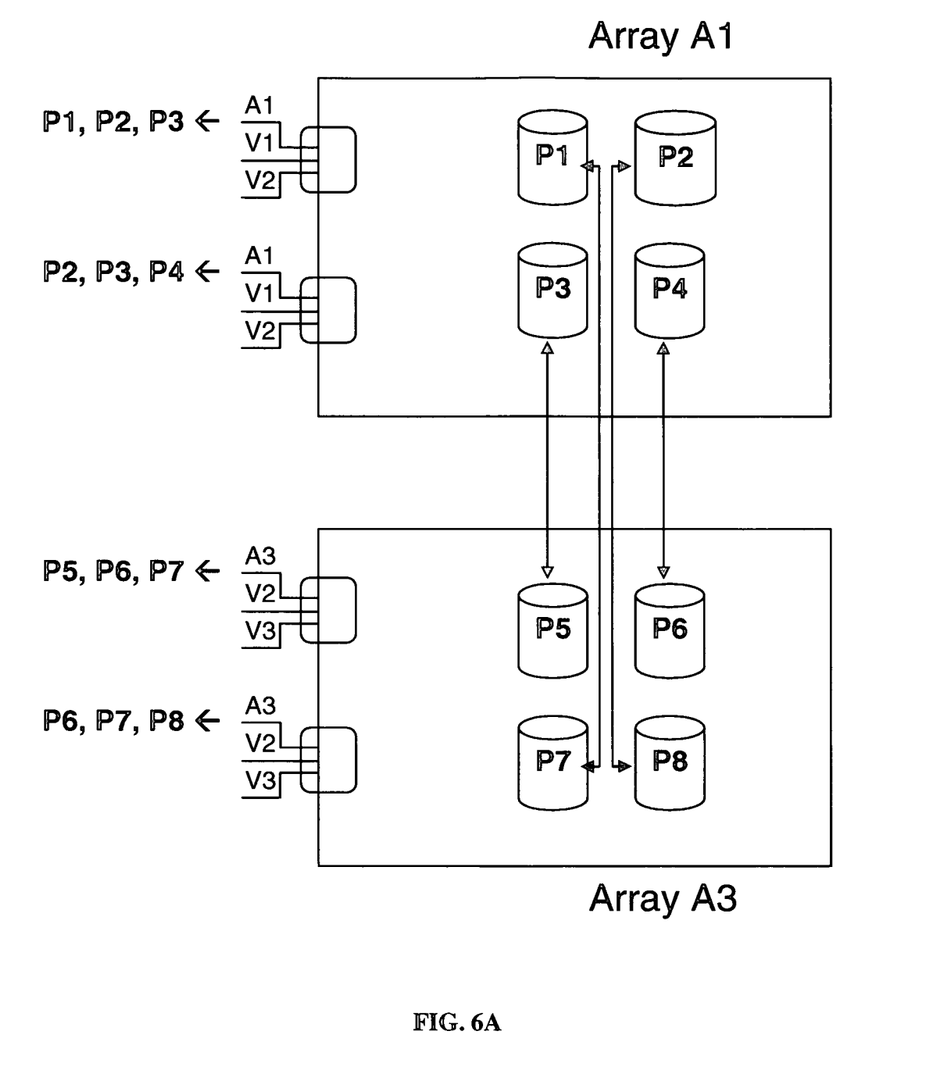
FIGS. 6A-6E are diagrams further illustrating the process as described in FIG. 5.

FIGS. 6A through 6E illustrate a virtual array being created in a physical array. FIG. 6A shows Physical Arrays A1 and A3. Array A1 contains Physical Volumes P1, P2, P3 and P4. Array A3 contains Physical Volumes P5, P6, P7, and P8. Array A1 has exposures P1, P2 and P3 via Port 1. Array A1 also has exposures P2, P3, and P4 via Port 2. Array A3 has exposures P5, P6, and P7 via Port 3. Array A3 also has exposures P6, P7, and P8 via Port 4.

Figure 6B:
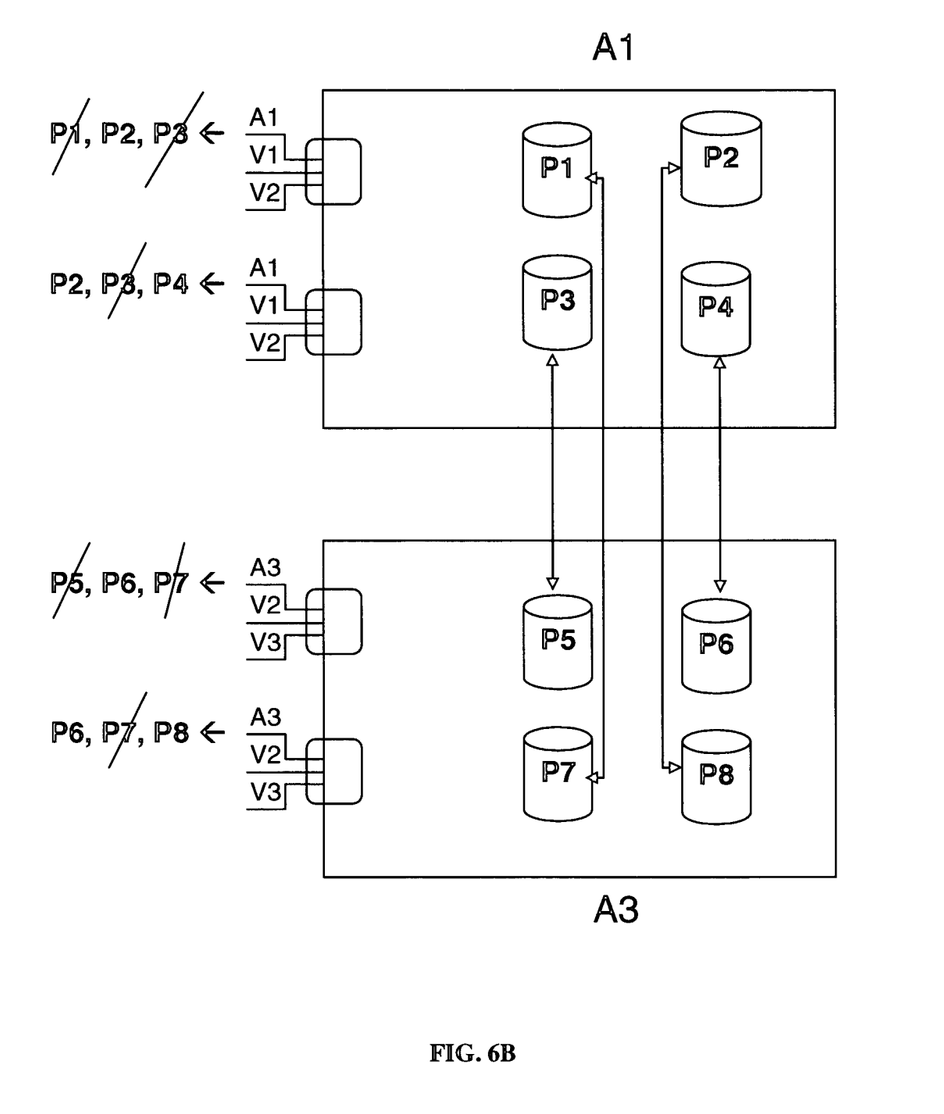

FIG. 6B illustrates the physical exposures being removed, as described in step 500 of FIG. 5. Exposures P1 and P3 are removed from Port 1. Exposure P3 is removed from Port 2. Exposures P5 and P7 are removed from Port 3. Exposure P7 is removed from Port 4.

Figure 6C:
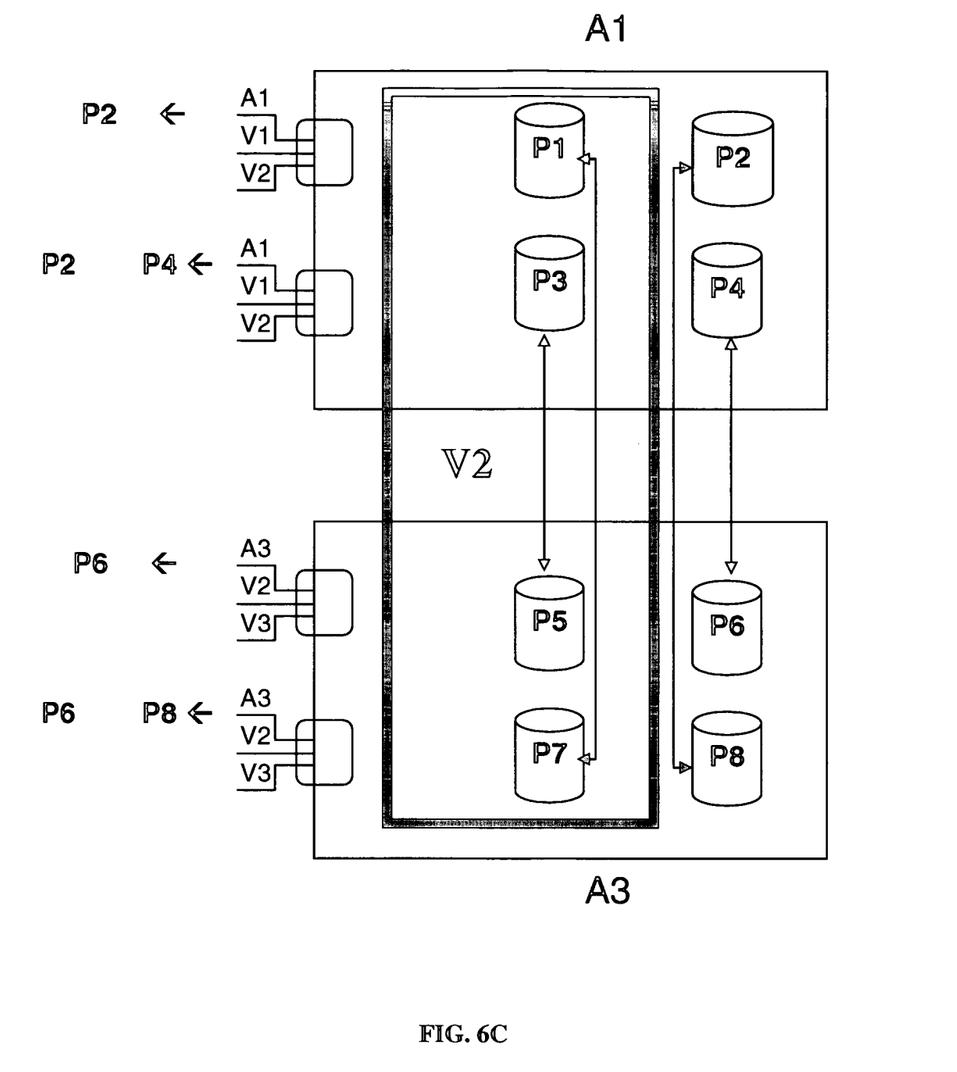

FIG. 6C illustrates transferring the ownership of physical volumes to a virtual array, as described in step 502 of FIG. 5. Virtual Array V2 now owns Physical Volumes P1, P3, P5, and P7.

Figure 6D:
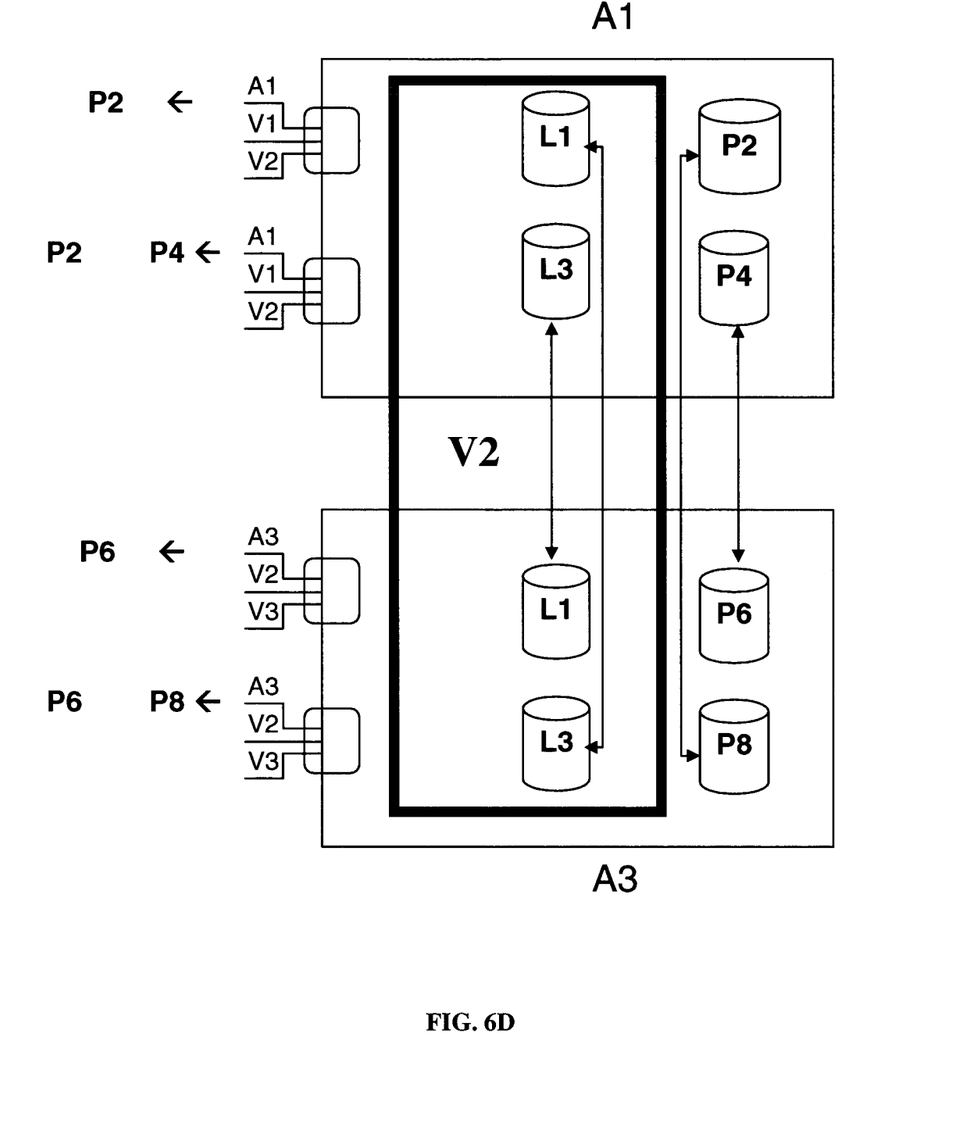
Figure 6E:
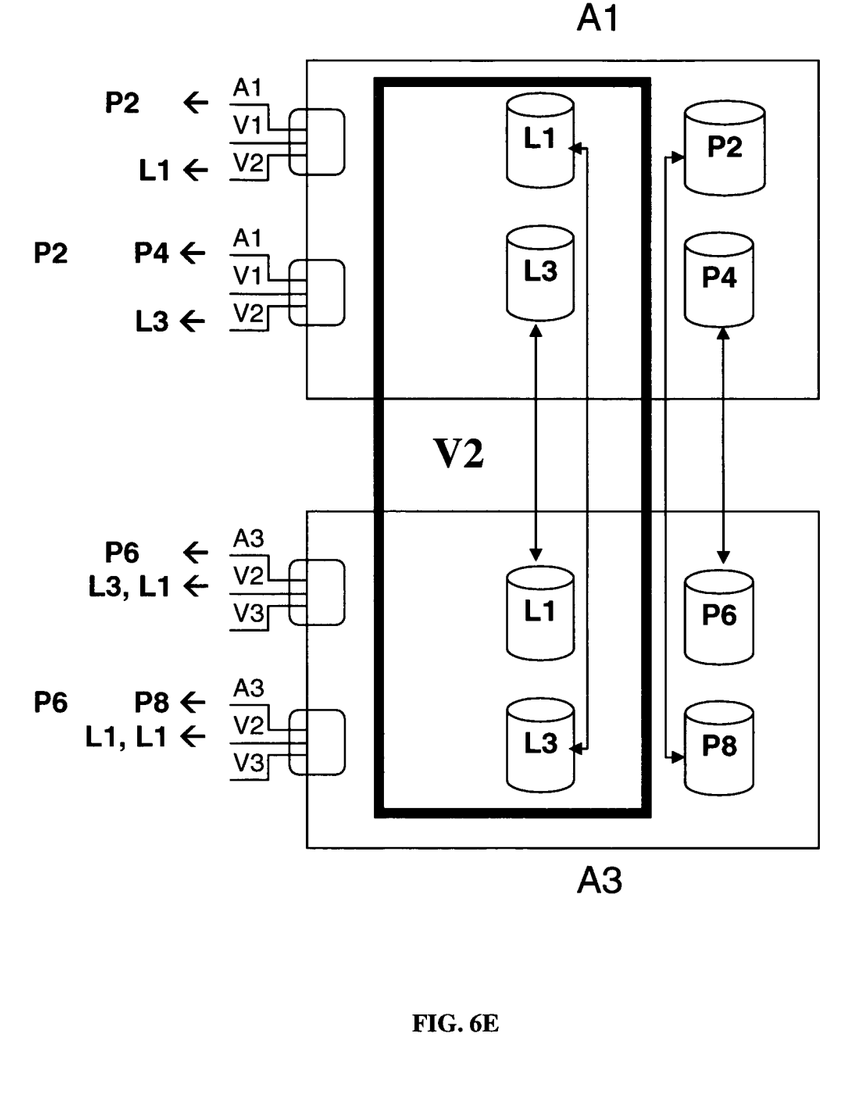

FIG. 6D illustrates creating identities for the volumes in Virtual Array V2. Physical Volumes P1 and P5 now have a new Virtual Identity L1. Physical Volumes P3 and P7 now have ea new Virtual Identity L3. Note how Virtual Identity L1 resides in two different physical arrays (Array A1 and Array A3). Similarly, Virtual Identity 13 resides in two different physical arrays.

Thus, by keeping physical volumes intact, the present invention allows for seamless migration from physical to virtual arrays and active/active replication. The inherent services of the underlying physical array may still be used, while allowing for powerful and robust management of data storage systems.

For the sake of clarity, the processes and methods herein have been illustrated with a specific flow, but it should be understood that other sequences may be possible and that some may be performed in parallel, without departing from the spirit of the invention. Additionally, steps may be subdivided or combined.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for managing a virtual storage machine, comprising:
   identifying at least one unassigned volume in at least one physical array;
   associating the identified volumes to the virtual storage machine;
   naming each of the identified volumes a unique name independent of the at least one physical array;
   assigning at least one path to the virtual storage machine, the at least one path connects to the virtual storage machine using the unique name;
   forming a cluster with the at least one physical array as nodes of the cluster, wherein each of the nodes is identified by the unique name; and
   sharing metadata within the cluster by
      contacting a node of the virtual storage machine by the at least one physical array,
      seeking a permission to join the virtual storage machine from the node,
      changing the metadata to add the at least one physical array,
      creating a snapshot of the metadata,
      sending the snapshot of the metadata to the at least one physical array, and
      replicating the metadata to the nodes of the virtual storage machine to share the metadata among the nodes.

2. The method of claim 1, wherein replicating the metadata to the nodes of the virtual storage machine includes:
   replicating the metadata to the nodes of the virtual machine in a synchronous fashion.

3. The method of claim 1, further comprising:
   receiving the metadata by the nodes of the virtual storage machine; and
   acting on the metadata by the nodes in a synchronous fashion.

4. The method of claim 1, further comprising:
   removing a node from the virtual storage machine.

5. The method of claim 4, wherein the removing includes:
   allowing remaining nodes in the virtual storage machine to steal a lock that was previously held by the node;
   sending a notification to the remaining nodes; and
   notifying the node of the removal from the virtual storage machine.

6. The method of claim 5, further comprising:
   upon receiving the notification by the remaining nodes of the virtual storage machine, acting on the notification by the remaining nodes.

7. The method of claim 5, wherein the notification is synchronous.

8. The method of claim 1, further comprising:
   maintaining array services of the at least one physical array.

9. The method of claim 8, further comprising:
   using the array services to enable services between the nodes.

10. The method of claim 8, further comprising:
    synchronizing data and the metadata of the at least one physical array using the array services.

11. The method of claim 10, wherein the synchronizing includes linking each of the at least one physical array's volume to a corresponding volume in the cluster.

12. The method of claim 11, wherein the linked volumes have the same unique name.

13. The method of claim 1, wherein the unique name is named by a user or based on a user application.

14. The method of claim 1, further comprising enabling active/active replication.

15. The method of claim 1, further comprising enabling seamless migration.

16. The method of claim 1, further comprising creating consistency groups.

17. A system for maintaining a virtual storage machine, comprising:
    a metadata mechanism comprising a lock mechanism and a replication mechanism; and
    a processor configured to identify at least one unassigned volume in at least one physical array,
    associate the identified volumes to the virtual storage machine,
    name each of the identified volumes a unique name independent of the at least one physical array,
    assign at least one path to the virtual storage machine, the at least one path connects to the virtual storage machine using the unique name,
    form a cluster with the at least one physical array as nodes of the cluster, wherein each of the nodes is identified by the unique name, and
    share metadata within the cluster using the metadata mechanism by
       configuring the at least one physical array to contact a node of the virtual storage machine,
       configuring the at least one physical array to seek a permission to join the virtual storage machine,
       configuring the locking mechanism to change the metadata to add the at least one physical array,
       configuring the replication mechanism to create a snapshot of the metadata,
       configuring the replication mechanism to send the snapshot of the metadata to the at least one physical array, and
       configuring the replication mechanism to replicate the metadata to the nodes of the virtual storage machine to share the metadata among the nodes.

18. The system of claim 17, further comprising:
    the nodes of the virtual machine configured to receive the metadata; and
    the nodes configured to act on the metadata in a synchronous fashion.

19. The system of claim 17, further comprising: the processor configured to
    maintain array services of the at least one physical array,
    use the array services to enable services between the nodes, and
    synchronize data and the metadata of the at least one physical array using the array services, wherein the synchronizing includes linking each of the at least one physical array's volume to a corresponding volume in the cluster, and the linked volumes have the same unique name.

20. The system of claim 17, further comprising: the processor configured to
enable active/active replication,
enable seamless migration, and
create consistency groups.

\* \* \* \* \*